United States Patent Office 2,972,391
Patented Feb. 21, 1961

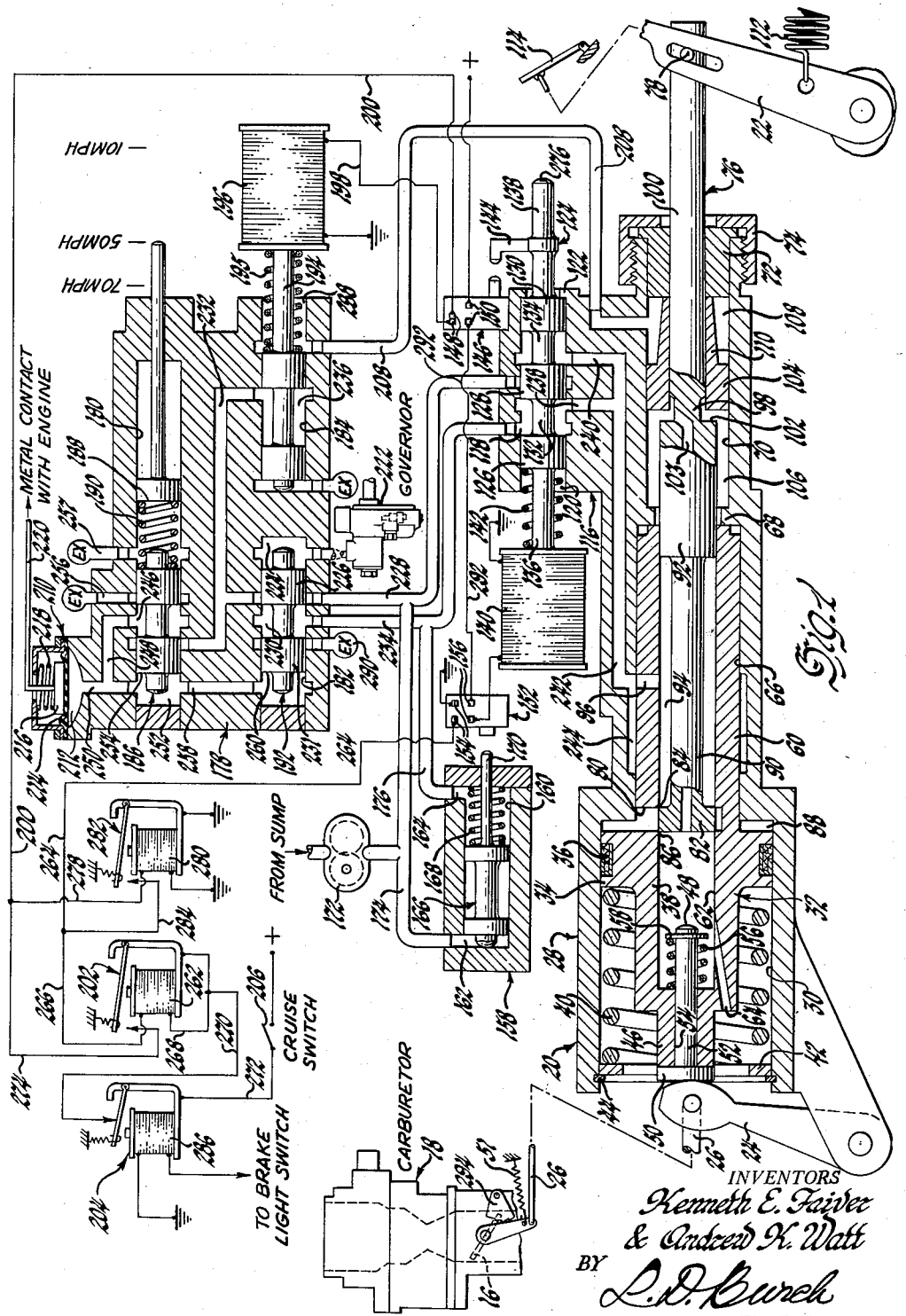

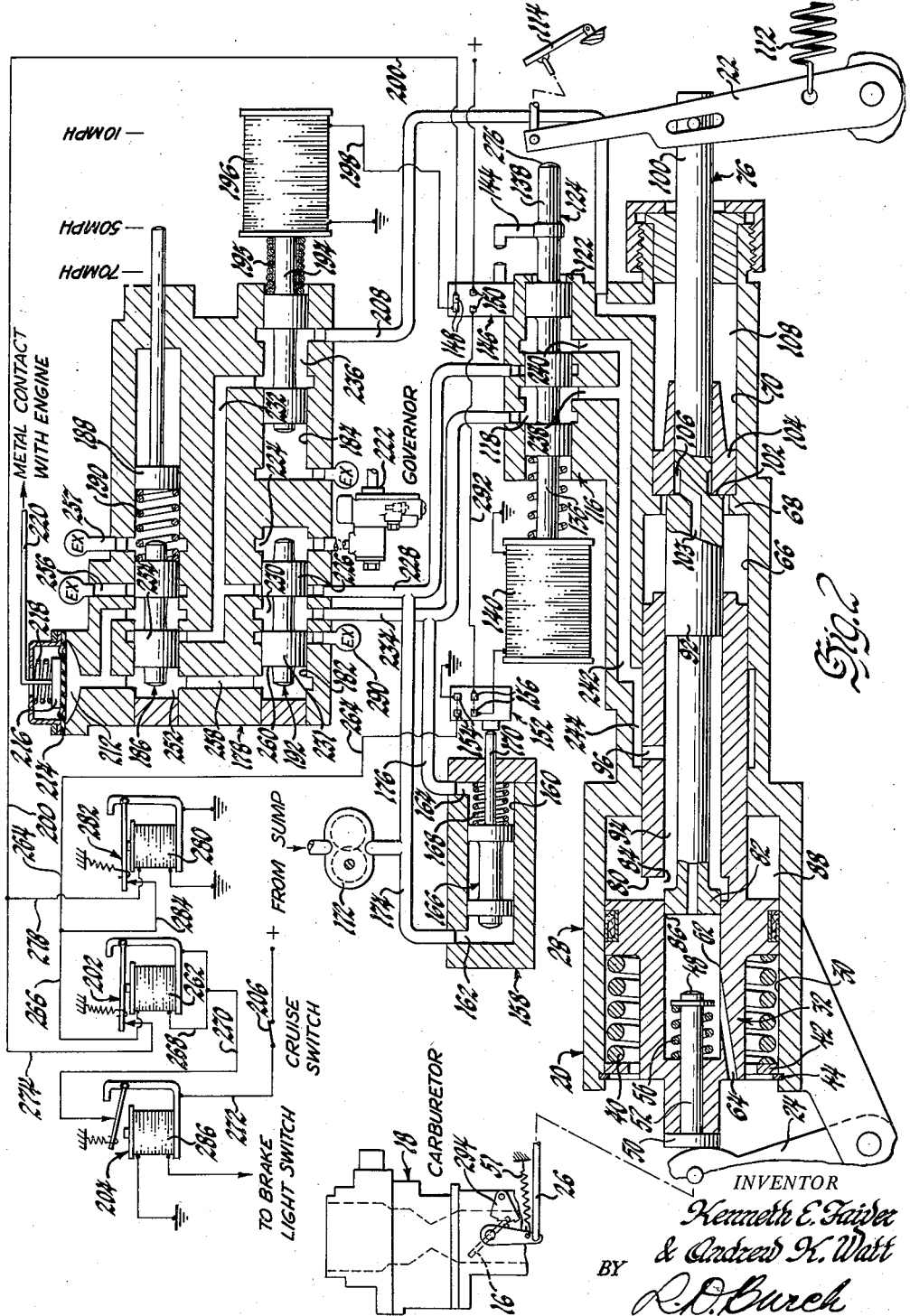

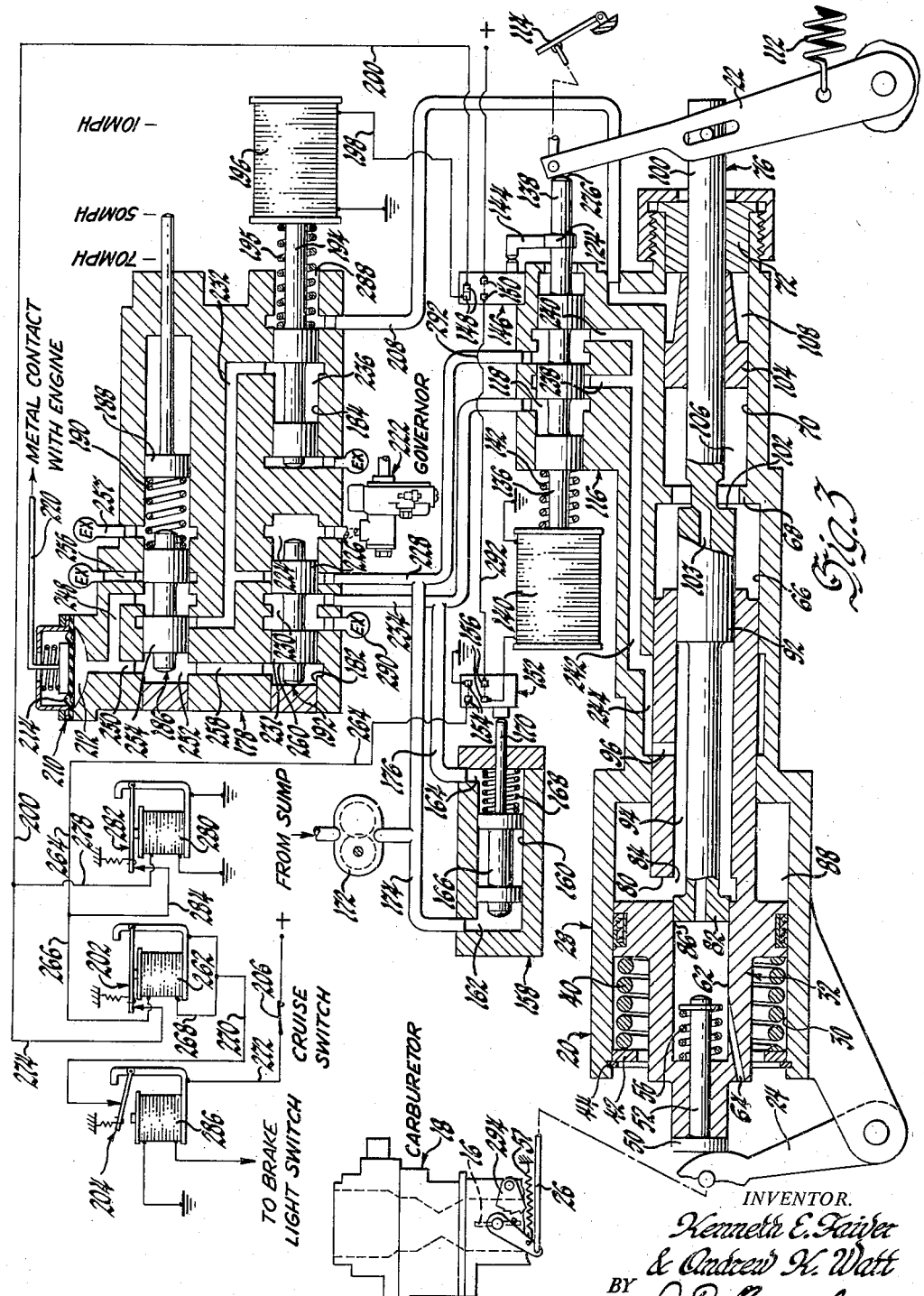

2,972,391

POWER THROTTLE AND VEHICLE SPEED CONTROL MECHANISM

Kenneth E. Faiver and Andrew K. Watt, Lansing, Mich., assignors to General Motors Corporation, Detroit, Mich., a corporation of Delaware Filed July 28, 1958, Ser. No. 751,382

7 Claims. (Cl. 180—82.1)

The invention relates to a mechanism for controlling the throttle of a vehicle and more particularly to a mechanism which provides power operation for the throttle at all times while the vehicle engine is operating. The mechanism will also provide automatic throttle operation to control the throttle so that the engine power is applied to maintain the vehicle at a constant predetermined speed under varying road conditions. The mechanism will also provide speed warning and maximum governed speed conditions.

The device normally operates as a power throttle. In all conditions of operation except one, the carburetor throttle linkage is operated by fluid power, the application of which is controlled by various elements of the mechanism. The single exception to power throttle operation provides for opening the throttle sufficiently to set the carburetor cam on fast idle by manually operating the accelerator and throttle linkage before the vehicle engine is started.

The mechanism can be operated as an automatic throttle by the vehicle operator. This is accomplished by closing a cruise switch on the vehicle instrument panel. Automatic control of the throttle will not be effective, however, until the vehicle speed is brought up to the preset cruise or limiting speed by the vehicle operator in the usual manner. When the cruise speed is attained, an electrical latching circuit causes the mechanism to operate as an automatic speed control. While the mechanism is so functioning, the driver may remove his foot from the accelerator pedal if he desires. The predetermined speed at which the mechanism is set for automatic operation may be adjusted by the driver at any time through appropriate controls preferably mounted on the vehicle instrument panel.

Automatic throttle control is discontinued if the vehicle brakes are applied, and full control of the engine throttle mechanism is returned to the driver. Once the brakes have been applied, automatic throttle control may be resumed only when the driver again brings the vehicle up to the speed set on the instrument panel control.

The mechanism may also be operated as a semi-automatic throttle or speed control by setting the desired speed on the instrument panel control but leaving the cruise switch open. The vehicle driver then operates the accelerator pedal in the usual manner to control the vehicle speed below the set limit. The mechanism provides no limiting action on engine operation so long as the vehicle is running at less than the preset speed. The speed of the vehicle will not exceed the preset speed even though the accelerator pedal is held in the open throttle position against a detent stop provided by the mechanism. The throttle will close if the driver removes his foot from the accelerator pedal. The driver therefore has full control of the throttle for all speeds below the preset speed but is prevented from exceeding the preset speed so long as he does not move the accelerator pedal beyond the detent stop provided.

When the mechanism is in either automatic or semi-automatic condition, the device may be overcontrolled to permit the vehicle to be driven faster than the cruising or limiting speed. This is accomplished by the operator's moving the accelerator pedal through the detent stop position. This action will cause the mechanism to assume the passing or overcontrol condition which permits complete engine control with the accelerator in any accelerator position as long as the vehicle speed is maintained above the preset speed. As soon as the vehicle speed decreases to the preset speed, the automatic or semi-automatic condition, as determined by the position of the cruise switch, is again resumed. When the mechanism is in the overcontrol condition, the throttle does not tend to go to the wide open position unless the accelerator is held in that position by the operator. Neither does it tend to close more than the amount permitted by the accelerator pedal if that pedal is held at any point between zero throttle and the wide open position.

An important feature of the invention is that, while the mechanism is in the automatic throttle condition, the accelerator pedal is held hydraulically in a position which is at or just short of the detent position. This is true regardless of the preset speed. Thus the vehicle operator may rest his foot on the accelerator pedal if he wishes without feeling pulsations due to the automatic throttle action which continually adjusts the throttle.

The mechanism embodying the invention is primarily a hydraulically operated device although some electrical controls are included. It preferably uses line pressure from a source such as an automatic transmission for power supply. It also preferably uses the output governor pressure of an automatic transmission as the vehicle speed sensing medium. Should such a source not be desirable or available, a hydraulic pump and governor may be included in the speed controlling unit with the governor being driven from any convenient source representative of car speed.

In the drawings:

Figure 1 is a schematic view of a mechanism embodying the invention having parts broken away and in section and showing the mechanism with the cruise switch open and the vehicle at less than the preselected cruising speed. It also shows the elements in position obtained with the cruise switch closed but before the preselected cruising speed is attained.

Figure 2 shows the mechanism of Figure 1 with the cruise switch closed and the device operating in the automatic throttle or cruise speed condition.

Figure 3 shows the mechanism of Figure 1 with the vehicle running at a speed greater than preselected cruise speed. It shows the accelerator pedal having passed through the full throttle detent position, although once this has been accomplished the throttle may be operated in any position. The cruise switch may be either opened or closed in this condition without affecting the mechanism.

The vehicle in which the mechanism is installed is provided with a throttle 16 in carburetor 18 for controlling the engine speed and power. A power unit 20, which includes primarily the power section of the mechanism, is installed in series with the throttle operating linkage. The accelerator pedal operated lever 22 is at the input end of power unit 20 and the throttle operating lever 24 is at the output end. Lever 24 is connected to throttle rod 26 for moving the throttle under influence of the power unit.

The power unit includes a stationary mounted housing 28 to which throttle operating lever 24 is pivotally attached. A cylinder 30 is formed in the output or forward end of the housing 28 and receives a portion of a power piston 32. This piston includes a land 34 having an oil seal 36 positioned in the circumferential portion thereof to prevent oil leakage from the power side of the piston to the unit exterior. Power piston 32 is provided with a reduced section 38 forward of land 34. A compression spring 40 is received within cylinder 30 and engages spring seat 42 which is held in the open end of cylinder 30 by snap ring 44. The other end of spring 40 engages the outer side of piston land 34. Spring 40 therefore normally urges the power piston 32 to the right as shown in the drawings. The forward end 46 of power piston 32 has a pin 48 received in an axial passage 54. Pin 48 is provided with a head 50 which engages the outer surface of forward end 46 on one side and is engageable with one end of throttle operating lever 24 on the other side. Lever 24 is held against pin head 50 by a suitable carburetor closing spring 51. The pin includes a shank 52 extending from head 50 through passage 54 and into the interior of power piston 32. A pin spring 56 engages spring seat 58 which is secured on the end of pin shank 52 and also engages the inner surface of power piston forward end 46. Spring 56 thus urges pin 52 to the right relative to power piston 32 and holds pin head 50 in engagement with power piston forward end 46.

Power piston 32 is also provided with a rear reduced section 60 which is provided with a cylindrical passage 62 extending axially through section 60 and into section 38 to the rear surface of section 46. An exhaust passage 64 is provided in section 38 so that the forward portion of cylindrical passage 62 is always exhausted to the atmosphere. The portion of housing 28 behind cylinder 30 is provided with a second cylinder 66 which is connected with cylinder 30 and coaxial therewith and receives the rear reduced section 60 of piston 32. A second cylinder 70 is formed in housing 28 in axial alignment with cylinder 66 and is separated therefrom by a land 68. The rear end of cylinder 70 is closed by a bushing 72 which is secured in place by a nut 74. An accelerator pedal actuated control valve 76 extends through an axial passage formed in bushing 72 and is received in cylindrical passage 62 of the power piston. Valve 76 thus extends through the chambers formed by cylinders 66 and 70. The inner diameter of land 68 is sufficiently larger than the outer diameter of valve 76 to provide free fluid connection between cylinders 66 and 70. The rear end of valve 76 is pivotally connected at 78 with the accelerator operated lever 22 so that the valve may be reciprocated in accordance with movements of the accelerator linkage.

Power piston 32 is also provided with a radially extending passage 80 in the portion of rear section 60 immediately adjacent land 34. Valve 76 has its forward end formed to provide a land 82 which is preferably of a width substantially equal to the width of passage 80. Thus when land 82 is positioned adjacent passage 80, ports 84 and 86 are provided, either of which may be connected with the piston chamber 88 formed by piston land 34 and the rear end of cylinder 30.

Valve 76 is provided with a reduced section 90 extending rearwardly from land 82. The rear end of reduced section 90 terminates at an elongated land 92. Lands 82 and 92 of valve 76 cooperate with reduced section 90 and the side wall of cylindrical passage 62 to provide an annular cavity 94 as well as to pilot valve 76 in passage 62. Section 60 of the power piston has a port 96 extending radially through one side thereof and connecting cavity 94 with a fluid supply passage to be described.

Valve 76 has another reduced section 98 adjacent land 92 and extending rearwardly therefrom for a relatively short distance. A land 100 extends rearwardly from section 98 and forms the rear end of valve 76 including that portion having pivotal connection 78. Reduced section 98 and land 92 cooperate to provide a shoulder 102 on the rear end of that valve. Valve 76 is also provided with a passage 103 extending axially therethrough from the forward end of the valve formed by land 82 to a point in the plane of shoulder 102 and then radially outward through reduced section 98. This passage provides an exhaust for the forward section of cylinder 70 during all operating conditions. A free piston 104 receives land 100 axially therethrough and is mounted for reciprocation in housing cylinder 70. Piston 104 divides cylinder 70 into a forward section 106 and a rear section 108 and functions as a holding element for valve 76. The piston also has a reduced end 110 which extends through section 108 and is engageable with bushing 72 in some operating conditions. Valve 76 is normally held in the position shown in Figure 1 by accelerator closing spring 112 which acts on lever 22 to normally hold the accelerator linkage including the accelerator pedal 114 in the zero throttle position.

Housing 28 may be provided with an extension 116 having a valve receiving passage 118 formed therein. Passage 118 is open at end 120 and partially closed at the other end by land 122. A detent valve 124 is received within and operates reciprocably in passage 118 and is mounted in such a manner that it may be engaged and moved by an extension of lever 22 when that lever is pivoted sufficiently counterclockwise as seen in the drawings. Valve 124 is provided with lands 126, 128, and 130 which are spaced by reduced sections 132 and 134. The outer ends 136 and 138 are formed as reduced sections. End 136 is connected with or forms a part of a slidable core shank received within a solenoid 140 and cooperates therewith to form a power holding relay. A compression spring 142 between one end of solenoid 140 and land 126 urges valve 124 to the right as seen in the drawings. Spring 142 provides the detent feel when the operator goes into the overcontrol or passing condition shown in Figure 3 and described below.

The end 138 of the valve is provided with a lug 144 extending radially therefrom and engageable with microswitch 146 which may be mounted on housing extension 116. This switch includes normally closed contacts 148 and normally open contacts 150. A microswitch 152 having normally first open contacts 154 and second normally open contacts 156 is provided to control solenoid 140. This solenoid will hold valve 124 in the position shown in Figure 3 when contacts 150 of switch 146 and contacts 156 of switch 152 are both cosed. The porting obtained by the movement of valve 124 and shown graphically in the various figures will be further described below.

A valve housing 158 is provided with a cylindrical passage 160 which has a port 162 connected with one end and a port 164 connected with the other end. A spool valve 166 is received within passage 160 and is biased toward the end having port 162 by a compression spring 168. Valve 166 has an extension 170 which extends through spring 168 and outside housing 158. A fluid pump 172 provides line pressure for power operation of the system. This pump is connected with port 162 through conduit 174. Port 164 of passage 160 is connected with throttle operating pressure conduit 176.

Another valve body 178 contains valve chambers 180, 182, and 184. A spool type reference pressure valve 186 is received within one end of chamber 180 and an adjustable spring seat 188 is received within the other end of that chamber. A compression spring 190 is received between valve 186 and seat 188 and adjusted by movement of the seat. Valve 186 provides the reference pressure which is a function of an instrument panel dial setting controlling movement of seat 188. The reference pressure is balanced against an output governor pressure by means of a spool type regulator or governor valve 192. This valve is received within valve chamber 182.

A spool type control valve 194 is mounted in valve chamber 184 and controls the admission of line pressure to section 108 of cylinder 70 in the power unit. A spring 195 tends to hold valve 194 to the left as seen in the drawings so that section 108 will be open to exhaust under influence of the spring.

A solenoid 196 has a sliding core which may be formed as an extension of one end of valve 194 and together therewith forms a power holding relay. Solenoid 196 is connected by electrical lead 198 to the normally closed contacts 148 of microswitch 146. It may be energized by electricity passing through electrical lead 200, the normally open contacts of relay 202, through the normally closed contacts of relay 204 and through the instrument panel mounted cruise switch 206. When solenoid 196 is energized, it moves valve 194 to the right to admit fluid under line pressure to section 108 of cylinder 70 through conduit 208 as shown in Figure 2.

An exciter 210 may be provided adjacent valve 186 if the valve response sensitivity of valve 192 is not sufficiently high. The exciter includes a chamber 212 formed in a portion of valve body 178. This chamber is covered by a flexible diaphragm 214 to which weight 216 is secured. A spring 218 biases weight 216 in diaphragm 214 toward chamber 212. A rod 220 is attached to weight 216 and extends to and is connected with a portion of the vehicle engine to pick up vibrations which are transmitted to diaphragm 214. Small, sharp, pulsations will be induced in the reference pressure acting on valve 192 and will keep that valve agitated so that the valve response sensitivity is increased.

An output shaft governor 222 such as that normally provided on automatic transmissions discharges fluid at pressures which are dependent upon vehicle speed. Fluid under governor pressure is delivered from the governor 222 to the governor pressure chamber 224. This chamber is formed in one end of valve chamber 182 by valve 192. Land 226 of valve 192 acts as a chamber wall. A conduit 228 delivers line pressure to the valve chamber 182. A chamber 230 may be formed by the lands 226 and 231 of valve 192. Conduit 228 also connects with channel 232 formed in valve body 178. This channel connects with valve chambers 180 and 184. Conduit 234 may connect with valve chamber 182 adjacent conduit 228. Valve 194 has a chamber 236 formed between two lands thereof. This chamber is always connected with channel 232. Conduits 228 and 234 are connected with housing extension 116 at spaced points opening into valve receiving passage 118. Ports 238 and 240 lead from valve receiving passage 118 to a common channel 242 formed in housing 28. This channel terminates in an annular chamber 244 to which port 96 of piston 32 is connected at all times.

Reference pressure valve 186 has a chamber 246 defined by a pair of lands. The valve body has channels 248 and 250 formed therein adjacent valve chamber 180 and connected with each other and the valve chamber. Channel 250 is also connected with exciter chamber 212. Channel 250 is connected with valve chamber 180 at the reference pressure chamber 252. This chamber is defined by one end of the valve chamber 180 and land 254 of valve 186. An exhaust conduit 256 is provided in valve body 178 so that under some positions of valve 186, chamber 246 may be opened to exhaust. Another exhaust conduit 257 in valve body 178 exhausts the space between valve 186 and spring seat 188 so that the only force acting directly on both of these elements is that of spring 190. Reference pressure chamber 252 is connected with one end of valve passage 182 which is closed by the end 260 of land 231 formed on valve 192.

Referring now to Figure 1, that figure shows the mechanism with the cruise switch 206 open and the vehicle traveling at less than the cruise speed set on spring seat 188. By way of example, the preselected speed is indicated as fifty miles per hour. The various components of the mechanism will be in the same position should the cruise switch 206 be closed, but prior to the attainment of the fifty miles per hour cruise speed selected. Spring 190 exerts a load corereesponding to the selected speed against reference pressure valve 186, causing this valve to move to the left to admit line pressure into chamber 246 of valve 186. Line pressure passing into chamber 246 becomes reference pressure in that chamber and acts through channels 248 and 250 and chamber 252 against the land 254 of valve 186. This reference pressure increases until the force it exerts against land 254 is equal and opposite that of the force exerted against valve 186 by spring 190. A balanced condition occurs at this time and the reference pressure is maintained as a function of the instrument panel dial setting which adjusts the position of spring seat 188. Should any condition occur to upset this balance, such as the loss of oil around the valve or a change in dial setting, valve 186 will move a slight amount to either admit more fluid under line pressure into chamber 246 or to exhaust some fluid under the reference pressure through exhaust conduit 256 in order to maintain the balance condition.

The reference pressure regulated by valve 186 as described above is exerted through the passage 258 and against the end 260 of land 231 formed on valve 192. Governor pressure is imposed in chamber 224 at the opposite end of valve 192. As noted above, governor pressure is a function of vehicle speed. Thus the forces exerted axially on valve 192 are balanced when the governor pressure in chamber 224 is equal to the reference pressure acting on land 231. So long as the vehicle speed is less than the preset speed, the reference pressure predominates and valve 192 is moved to the right to admit line pressure from conduit 228 into control pressure chamber 230. This chamber is connected through conduit 234, passage 118, port 238, and channel 242 to chamber 244 and port 96 in the power piston 32. Control pressure in chamber 230 can thus be admitted to piston chamber 88 to operate the engine throttle 16 when the valve port 84 is opened.

When the vehicle operator moves the accelerator pedal 114 to move valve 76 to the left, port 84 is opened a small amount. So long as the vehicle speed is under the preset speed, line pressure is admitted into piston chamber 88 as described above and acts against land 34 of power piston 32, moving the power piston to the left and causing the throttle 16 to open. As soon as power piston 32 has moved the distance traveled by valve 76, however, the port 84 is closed. Any further opening of the throttle therefore requires a corresponding additional movement of valve 76. The power unit thus functions simply as a servo for moving the engine throttle.

When the throttle has permitted increase of engine power and speed until the vehicle speed equals that for which the instrument panel dial is preset, further increase in vehicle speed will cause governor pressure in chamber 224 to act on valve 192 and overcome the reference pressure acting on the valve so that the valve moves to the left in a direction tending to exhaust control chamber 230 and power piston chamber 88. If at this time the operator holds the accelerator linkage in a position to keep port 84 open, he may allow lever 22 to engage the end 138 of valve 124 without exerting sufficient force to compress the detent stop spring 142. Valve 192 will seek a balanced condition between the governor pressure and the reference pressure and will maintain a control pressure in chamber 230 and piston chamber 88 which is sufficient to maintain the set vehicle speed. If the car begins to ascend a grade, a slight decrease in car speed will cause the governor pressure to decrease slightly, thereby increasing the throttle operating or control pressure in chamber 230 and in piston chamber 88. This will have the effect of producing an increase in throttle opening. When the vehicle is descending a grade the slight increase in vehicle speed will cause the governor pressure in chamber 224 to increase, thereby moving valve 192 slightly to the left to exhaust chamber 230, thereby reducing the control pressure and permitting the throttle to close a corresponding amount. When the control pressure is reduced in power piston chamber 88, spring 40 will move the power piston 32 to the right and the throttle linkage will follow since it is biased toward the closed throttle position by spring 51. If at this time the vehicle operator releases the accelerator pedal 114 and its corresponding lever 22 sufficiently to move valve 76 so that port 84 is closed and port 86 is opened, oil will be exhausted from power piston chamber 88 and the throttle will close until port 86 is again closed. If valve 76 is moved to the extreme right, port 86 will remain open and piston 32 will be returned by spring 40 to its stop position shown in Figure 1 which corresponds to the slow idle carburetor position.

If the cruise switch 206 is closed, the conditions prevailing for automatic throttle operation are identical to those just described for semi-automatic throttle operation up to the operational point where vehicle speed equals the preset speed. At this time the control pressure in chambers 230, 160, 118, 244, 94, and 88 becomes less than line pressure. This condition is shown in Figure 2. When this condition is reached, valve 166 moves to the right against spring 168. The valve extension 170 engages microswitch 152 and closes the normally open contacts 154 and 156. Coil 262 of relay 202 is thus energized through electrical leads 264, 266, 268, and 270, normally closed relay 204, electrical lead 272, and cruise switch 206. The energization of coil 262 causes the normally open contacts of relay 202 to close, applying electricity through electrical leads 274 and 200, normally closed contacts 148 of microswitch 146, and electrical lead 198 to solenoid 196. When this solenoid is energized, valve 194 is moved to the right against spring 195 to admit line pressure from conduit 232 to pass through chamber 236 and conduit 208 to section 108 of cylinder 70. Free piston 104 is moved under the influence of line pressure in section 108 to the left and engages land 68 of housing 28. While moving to the left, piston 104 contacts shoulder 102 on valve 76 and moves that valve to the left so that port 84 will remain open for any position of power piston 32. Piston 104 thus acts as a holding valve for control valve 76. Movement of valve 76 will also cause movement of the accelerator operated lever 22 in a counterclockwise direction until its outer end stops near or against detent stop 276 on the end 138 of valve 124. Thus the accelerator pedal is held in the full throttle position and on the detent stop. The vehicle driver may rest his foot against the stop or may remove his foot entirely from the accelerator pedal if desired.

When the normally open contacts of relay 202 are closed, as described above, electricity is also applied through electrical lead 278 to the coil 280 of relay 282. When this relay is energized, electricity passes through these contacts and electrical lead 284 to the coil 262 of relay 202. The electrical circuit for solenoid 196 is thus maintained electrically and is not disturbed if control pressure variations in chamber 230 momentarily cause valve 166 to shift to the left and open the ground circuit of coil 262 through contacts 154 of microswitch 152.

Should the vehicle brakes be applied, the brake light switch will be closed and coil 286 of relay 204 will be energized. The normally closed contacts of this relay are therefore opened and coils 262 and 280 of relays 202 and 282 as well as solenoid 196 are de-energized. Spring 195 is thus permitted to act on valve 194 and it moves this valve to the left to cut off line pressure being supplied to section 108. At the same time it exhausts fluid in this section to atmosphere through conduit 208 and exhaust passage 288. Valve 76 is then free to return to the closed position shown in Figure 1 under influence of spring 112, assuming that the vehicle operator's foot is not holding the accelerator pedal 114 down. The vehicle operator would normally have the accelerator pedal in the zero throttle position when applying the vehicle brakes. When valve 76 moves to the right, port 86 is opened and power chamber 88 is exhausted through chamber 62 and exhaust 64. Thus the power piston moves to the right and the throttle is closed.

When the electrical latching circuit for solenoid 196 is deenergized by applying the vehicle brakes as described, the circuit cannot be electrically latched in the energized condition for automatic throttle operation until the vehicle operator accelerates to bring the vehicle speed back up to the preset speed. The operator must do this by manual control of the accelerator pedal.

When for any reason the vehicle operator deems it necessary to increase the vehicle speed to a value higher than the preset speed, he moves the accelerator operated lever 22 through the detent stop position. This action moves valve 124 to the left, compressing spring 142 and operating microswitch 146 to open contacts 148 and close contacts 150. This action may be taken when the mechanism is in either the automatic or semi-automatic throttle conditions. The results of this action are shown in Figure 3.

Control pressure from chamber 230 of valve 192 is cut off from chamber 94 by the movement of valve 124 to the left. Valve 124 also directs line pressure to chamber 94 through port 240. Since valve 76 is moved fully to the left, port 84 is opened to permit line pressure to be imposed against power piston 32 in chamber 88. This pressure moves piston 32 to the left and begins to open the throttle 16. Since the engine speed and power output increases, the vehicle speed also increases. This in turn causes an increase in governor pressure in chamber 224 so that it predominates in acting on valve 192 and shifts this valve to the left against the reference pressure. Control pressure chamber 230 is then exhausted through exhaust port 290, as is chamber 160 of valve 166. Line pressure acting on valve 166 moves that valve to the right against spring 168 to close the normally open contacts 154 and 156 of microswitch 152. Electricity is then applied through contacts 150 of microswitch 146, electrical lead 292, and contacts 156 of microswitch 152 to energize solenoid 140. This solenoid holds valve 124 in the detent position against the force exerted by spring 142. This condition will prevail as long as the vehicle speed remains above the preset speed. At the same time that contacts 150 are closed, contacts 148 are opened to deenergize solenoid 196, thereby permitting movement of valve 194 to the left under the influence of spring 195. This movement of valve 194 exhausts section 108 of cylinder 70 and temporarily releases the automatic throttle feature. The vehicle operator may then control the throttle with the accelerator pedal in the usual manner with any degree of throttle opening and the unit becomes a power assist mechanism for movement of the throttle as long as the vehicle speed remains above the preset speed.

As soon as the vehicle speed decreases to a value below that of the preset speed, governor pressure in chamber 224 will decrease to a value below that of the reference pressure acting on valve 192. Valve 192 will then move to the right, closing exhaust port 290 and filling chamber 230 with fluid under line pressure from conduit 228. Valve 166 is moved to the left and again hydraulically balanced by control pressure from chamber 230. Movement of this valve causes contacts 154 and 156 to open, thus deenergizing solenoid 140 and releasing valve 124 to its normal position shown in Figures 1 and 2. Thus the condition in effect immediately prior to the detent action of the operator is restored and the mechanism once again operates the throttle either automatically or semi-automatically.

The only manual operation of the throttle is obtained by moving the accelerator through the detent position before the vehicle engine is started. Since there is no oil pressure in the system, the end of valve 76 on which land 82 is located will engage the end of shank 52 of pin 48.

Further movement of the accelerator linkage and valve 76 will move pin 48 to the left relative to power piston 32 and against the force of spring 56. This movement will manually open throttle 16 so that fast idle cam 294 is engaged when desired.

Relay 204, with normally closed contacts, is provided when the braking signal is taken from the standard normally open brake light switch. If this switch is provided with an additional set of normally closed contacts, relay 204 will not be necessary.

A mechanism has thus been provided which will operate as a power throttle to move the throttle of a vehicle engine under normal driving conditions in accordance with the vehicle operator's control of the accelerator pedal. It will provide an automatic throttle operating condition which will maintain the vehicle at any desired road speed irrespective of grade variations. It will operate as a maximum speed governor which will not permit the vehicle to exceed a preset speed. It also permits overcontrol of either the automatic or semi-automatic condition when desired to accelerate the vehicle to speeds beyond the preset speed. It will release the automatic or semi-automatic features of the mechanism at any time when the vehicle brakes are actuated.

The invention has been described as being embodied in a device which utilizes vehicle speed to produce a governor pressure, with a reference pressure being provided which is a function of a desired vehicle speed. It may also be embodied in any device in which the governor pressure is a function of any engine driven member with the reference pressure provided as a function of the speed of that member. An engine speed governor and control unit, for example, may be made within the purview of the invention.

What is claimed is:

1. In a throttle control for an engine driven vehicle, the combination of fluid actuated mechanism for operating the throttle, a control valve operative to control said fluid actuated mechanism below a selected vehicle speed so as to vary the position of the throttle, reference valve means for producing a reference pressure corresponding to the selected vehicle speed, governor means for producing a governor pressure representative of vehicle speed, and regulator valve means for developing a control pressure reflective of the reference pressure and the governor pressure, the control pressure actuating said fluid actuated mechanism and controlling said fluid actuated mechanism when the vehicle speed increases to the selected vehicle speed.

2. In a throttle control for an engine driven vehicle, the combination of fluid actuated mechanism for operating the throttle, a control valve operative to control said fluid actuated mechanism below a selected vehicle speed to vary the throttle position, reference valve means for producing a reference pressure corresponding to the selected vehicle speed, governor means for producing a governor pressure representative of vehicle speed, regulator valve means for developing a control pressure reflective of the reference pressure and the governor pressure, the control pressure controlling said fluid actuated mechanism, and a detent valve for interrupting control of said fluid actuated mechanism by the control pressure.

3. In a throttle control for an engine driven vehicle, the combination of fluid actuated mechanism for operating the throttle, a control valve operative to control said fluid actuated mechanism below a selected vehicle speed to vary the throttle position, reference valve means for producing a reference pressure corresponding to the selected vehicle speed, governor means for producing a governor pressure representative of vehicle speed, regulator valve means for developing a control pressure reflective of the reference pressure and the governor pressure and controlling said fluid actuated mechanism, and a detent valve for interrupting the supply of control pressure to said fluid actuated mechanism.

4. In a throttle control for an engine driven vehicle, the combination of fluid actuated mechanism for operating the throttle, a control valve operative to control said fluid actuated mechanism below a selected vehicle speed to vary the throttle position, a reference valve positionable in various settings corresponding to the selected vehicle speed for producing a corresponding reference pressure, and regulator valve means for controlling said fluid actuated mechanism in accordance with actual vehicle speed and the selected vehicle speed whereby the throttle is positioned to maintain the vehicle at the selected vehicle speed.

5. In combination in a throttle control for an engine driven vehicle, fluid actuated mechanism for operating the throttle, a control valve operative to control said fluid actuated mechanism below a selected vehicle speed so as to vary the throttle position, a governor driven at a speed proportional to vehicle speed to produce a corresponding governor pressure, and regulator means for controlling said fluid actuated mechanism in accordance with vehicle speed and the selected vehicle speed to position the throttle to maintain the vehicle at the selected vehicle speed, said regulator means including a reference valve positionable in various settings corresponding to the selected vehicle speed for producing a corresponding reference pressure and a regulator valve having the reference pressure and the governor pressure acting on opposite ends thereof so as to produce a control pressure reflective of the differential between the reference pressure and the governor pressure, the control pressure being transferred to and acting on said fluid actuated mechanism.

6. In combination in a throttle control for an engine driven vehicle, fluid pressure actuated mechanism for controlling the throttle, a control valve operative to control said fluid actuated mechanism below a selected vehicle speed to vary the throttle position, reference valve means for producing a reference pressure corresponding to the selected vehicle speed, regulator valve means for controlling said fluid actuated mechanism in accordance with vehicle speed and the reference pressure so as to position the throttle to maintain the selected vehicle speed, and exciter means introducing a pulse in the reference pressure so as to maintain said regulator valve means in an active state.

7. The combination of claim 6, said exciter means including a diaphragm having one side connected with the reference pressure and the other side connected with a source of vibration.

References Cited in the file of this patent

UNITED STATES PATENTS

| | | |
|---|---|---|
| 1,822,667 | Proell | Sept. 8, 1931 |
| 2,160,194 | Bates | May 30, 1939 |
| 2,324,191 | Bowers | July 13, 1943 |
| 2,714,880 | Riley | Aug. 9, 1955 |
| 2,897,906 | Brueder | Aug. 4, 1959 |
| 2,916,100 | Teetor | Dec. 8, 1959 |